(12) United States Patent
Munz

(10) Patent No.: US 8,937,776 B2
(45) Date of Patent: Jan. 20, 2015

(54) PRISMATIC GLASS LAMINATE

(75) Inventor: Nathan Munz, Victoria (AU)

(73) Assignee: Nabe Pty Ltd, Melbourne Victoria (AU), as Trustee for the Glass Trust Abn 62 623 586 648

(*) Notice: Subject to any disclaimer, the term of this patent is extended or adjusted under 35 U.S.C. 154(b) by 26 days.

(21) Appl. No.: 13/805,570

(22) PCT Filed: Jul. 18, 2011

(86) PCT No.: PCT/AU2011/000902
§ 371 (c)(1),
(2), (4) Date: Dec. 19, 2012

(87) PCT Pub. No.: WO2012/009745
PCT Pub. Date: Jan. 26, 2012

(65) Prior Publication Data
US 2013/0094103 A1 Apr. 18, 2013

Related U.S. Application Data

(60) Provisional application No. 61/365,529, filed on Jul. 19, 2010.

(30) Foreign Application Priority Data

Apr. 12, 2011 (AU) ................................ 2011901346

(51) Int. Cl.
G02B 5/04 (2006.01)
B32B 3/14 (2006.01)
B32B 17/10 (2006.01)
B44C 1/18 (2006.01)
B44C 3/12 (2006.01)
B44C 5/04 (2006.01)

(52) U.S. Cl.
CPC . *G02B 5/045* (2013.01); *B32B 3/14* (2013.01); *B32B 17/10018* (2013.01); *B32B 17/10247* (2013.01); *B32B 17/10761* (2013.01); *B44C 1/18* (2013.01); *B44C 3/12* (2013.01); *B44C 5/0407* (2013.01); *B32B 2264/101* (2013.01)
USPC .......................................... 359/834; 359/837

(58) Field of Classification Search
None
See application file for complete search history.

(56) References Cited

U.S. PATENT DOCUMENTS

| 1,359,893 | A | | 11/1920 | Hopkins |
| 3,349,158 | A | | 10/1967 | Maynard |
| 4,318,946 | A | | 3/1982 | Pavone |
| 4,438,165 | A | * | 3/1984 | Butler ............................ 428/38 |
| 4,904,513 | A | | 2/1990 | De Nicolo |
| 7,903,308 | B2 | * | 3/2011 | Commander et al. ............ 359/2 |

FOREIGN PATENT DOCUMENTS

JP 01-028253 1/1989

* cited by examiner

*Primary Examiner* — Jade R Chwasz
(74) *Attorney, Agent, or Firm* — Head, Johnson & Kachigian, P.C.

(57) ABSTRACT

A prismatic glass laminate comprising: (a) a substrate; and (b) a plurality of prismatic glass elements mounted on said substrate, each element comprising: (i) a mounting surface to which a laminating interlayer is applied, said laminating interlayer providing adhesion of said element to the substrate; and (ii) a lateral surface to which a laminating interlayer is applied, said laminating interlayer providing adhesion of said element to the lateral surface of an adjacent element.

26 Claims, 11 Drawing Sheets

# PRISMATIC GLASS LAMINATE

CROSS-REFERENCE TO PENDING APPLICATIONS

This application is a national phase patent application of International PCT Patent Application No. PCT/AU11/00902 dated Jul. 18, 2011 which claims benefit of U.S. Provisional Patent Application Ser. No. 61/365,529 filed Jul. 19, 2010, which is hereby incorporated by reference in its entirety.

FIELD OF THE INVENTION

This invention relates generally to prismatic glass laminates and, in particular, to laminates comprising a plurality of prismatic glass elements. The invention is particularly useful in relation to decorative architectural applications, however it should be understood that the invention is intended for broader application and use.

BACKGROUND OF THE INVENTION

In this specification unless the contrary is expressly stated, where a document, act or item of knowledge is referred to or discussed, this reference or discussion is not an admission that the document, act or item of knowledge or any combination thereof was at the priority date, publicly available, known to the public, part of common general knowledge; or known to be relevant to an attempt to solve any problem with which this specification is concerned.

The term "prismatic glass" used herein is glass with machined surfaces of relatively large area and optically flat but polished to generate a prismatic effect. The prisms refract light rays and change their direction.

The use of prismatic glass in architectural and design applications began in the late 19th century with the introduction of prismatic glass transoms, also known as prismatic transom windows, which provided a practical means of directing sunlight into building interiors. With origins in sidewalk vault lights and glass panels used on ship decks, the prismatic tiles used in these windows included ridges, or similar raised patterns, on their inside surface that refracted incident sunlight toward the rear of a building. Varying designs of prismatic glass tiles were developed in an attempt to increase natural light levels within buildings, and thereby reduce reliance on artificial light sources. The use of prismatic glass tiles, especially in storefronts, was prominent until about the 1930s when the dominance of electrical light sources led to their functional obsolescence.

In more recent times, prismatic glass laminates have become desirable as decorative architectural elements in both interior and exterior applications. A basic prismatic glass laminate will include some form of faceted glass applied or affixed to an underlying substrate, which allows the laminate to be mounted to a surface. However, many modern architectural applications require that prismatic glass laminates use precision faceted glass and maintain a high degree of structural integrity even when damaged or fractured.

A conventional approach to fabricating a prismatic glass laminate involves affixing a panel of faceted glass to one or more substrate layers using a suitable laminating interlayer. An example of this conventional construction is illustrated in FIGS. 1A and 1B of the drawings. FIG. 1A shows a side view line drawing of a conventional prismatic glass laminate 100, whilst FIG. 1B shows a perspective view line drawing of the same conventional prismatic glass laminate 100. The laminate 100 includes a single prismatic glass element 102 having a number of facets or ridges along its upper surface. The glass element 102 is affixed to a substrate 104 using a suitable laminating interlayer 106 which bonds the glass element 102 to the substrate 104.

Many architectural applications, such as the use of prismatic glass laminates in building windows, require that glass panels be used as the substrate 104 to allow light to enter the building. Glass panel substrates 104 are also used in prismatic glass laminates for many other applications requiring the refraction and reflection of light through many different angles, to achieve a variety of different effects. In particular, glass panel substrates 104 can be used in combination with appropriately shaped prismatic glass elements 102 to achieve the refraction of white light into colours of the visible spectrum which can be observed from one or both sides of the glass laminate. These architectural applications commonly use a laminating interlayer 106 known as polyvinyl-butyral (PVB) which provides a strong bond between the glass element 102 and the substrate 104. The PVB is a resin that provides optical clarity, which is beneficial in applications where the substrate is a glass panel, and flexibility to allow for minor shifts in the position of the glass element 102. However, it should be understood that it is also possible to affix the glass element 102 to any number of building or construction surfaces such as metal, timber, concrete, or plastic, using an alternate laminating interlayer.

Laminating interlayers, such as PVB resin are commonly used in the automotive and architectural industries where it is necessary to bond together two panels of glass, such as automobile windshields and safety glass. This bonding process often takes place under conditions of heat and pressure, which cause the PVB interlayer to become optically clear and bind together the two panels of glass. The primary functions of the laminating interlayer are to retain any resulting shards of glass in the event that the glass pane is fractured, and to maintain a degree of structural integrity of the panel after fracturing.

In spite of the benefits that result from using laminating interlayers, the conventional construction of prismatic glass laminates, such as the laminate shown in FIGS. 1A and 1B, still include a number of significant limitations:

If the faceted surface of the prismatic glass element 102 is required to be machined from float glass, then it is not possible to achieve the required flat and polished surface finish using peripheral wheels. It is also impractical to efficiently operate cup wheels, in a sequential manner, to obtain the desired finish. Similarly, if the prismatic glass element 102 is cast, then the process of grinding and polishing the cast surface involves similar problems to those encountered with float glass.

The lamination of large pieces of manufactured glass is often problematical, as there is a propensity for the glass to crack during the lamination process. This is particularly the case for faceted glass which has substantial variations in thickness and therefore reduced strength in areas where the glass is thinner. Similarly, for cast glass, deviations in the overall flatness of the glass must often be eliminated by machining the flat face prior to lamination.

It is often difficult to toughen or "temper" faceted glass whilst maintaining flatness, due to the significant variations in the thickness of the faceted glass.

If the prismatic glass element 102 is cracked as a result of impact or external stresses, these cracks can propagate to the edges of the glass element and large pieces or shards of glass can become dislodged. Any dislodged shards of glass present a significant danger to persons and/or property at lower elevations.

The overall thickness of the prismatic glass element 102 is generally dictated by the minimum thickness required to prevent fracture of the glass as a result of deflection caused by wind or other loads.

In this specification where a document, act or item of knowledge is referred to or discussed, this reference or discussion is not an admission that the document, act or item of knowledge or any combination thereof was at the priority date, publicly available, known to the public, part of the common general knowledge; or known to be relevant to an attempt to solve any problem with which this specification is concerned.

SUMMARY OF THE INVENTION

According to an aspect of the present invention, there is provided a prismatic glass laminate comprising:
(a) a substrate; and
(b) a plurality of prismatic glass elements mounted on said substrate, each element comprising:
  (i) a mounting surface to which a laminating interlayer is applied, said laminating interlayer providing adhesion of said element to the substrate; and
  (ii) a lateral surface to which the laminating interlayer is applied, said laminating interlayer providing adhesion of said element to the lateral surface of an adjacent element.

in a preferred embodiment, the prismatic glass laminate has the plurality of prismatic glass elements mounted on both sides of the substrate.

The configuration of the prismatic glass laminate according to an aspect of the invention includes a plurality of separate and distinct prismatic glass elements that are bonded laterally to one or more adjacent elements, as well as to the underlying substrate. This configuration provides a number of significant advantages over the conventional construction of prismatic glass laminates:

The individual prismatic glass elements can be manufactured by cutting float glass of an appropriate thickness or, alternatively, by casting or extruding a cross section that approximates the desired final (net) shape of the glass elements.

The conventional construction of prismatic glass laminates requires that the smallest cross section of the glass element (i.e. between the facets or ridges on the upper surface of the element) have a minimum thickness in order to prevent cracking of the glass element under load. However, by constructing the laminate using a plurality of prismatic glass elements, in accordance with the present invention, the thickness of the glass elements can be substantially reduced.

The prismatic glass elements can be efficiently and precisely ground and polished using a standard configuration of sequential diamond and compound grinding, and polishing cup wheels operating at high speeds. The smaller, more manageable, size of the prismatic glass elements also makes it possible to achieve very flat surfaces thereby enhancing the prismatic effect of the elements. Furthermore, the machinery required to perform the grinding and polishing processes could easily be designed as variations from existing machinery available from numerous suppliers in the glass industry.

Separating each prismatic glass element with a laminating interlayer ensures that a crack or fracture in an individual element does not propagate to adjacent elements. Furthermore, since the laminating interlayer is applied to at least two, and preferably three, surfaces of each prismatic glass element (including a lateral surface), it provides a greater degree of structural integrity. It also minimises the likelihood of large sections of prismatic glass becoming detached from the laminate assembly and causing injury or damage at lower elevations.

The laminating interlayer between each prismatic glass element allows the entire laminate assembly to have a greater degree of flexibility. It is thereby possible to avoid stresses being concentrated, or indeed generated, at the thinnest cross section of the prismatic glass assembly when the laminate is subjected to deflection by wind or other external forces. This, in turn, greatly reduces the likelihood of cracking and fracture of the prismatic glass elements.

If considered desirable, the prismatic glass elements could easily be thermally or chemically tempered without distortion.

The mounting surface and lateral surface of each of the plurality of elements may be planar. Advantageously, the bonds created between the prismatic glass elements and the substrate, and between adjacent elements, are improved by using elements having substantially flat mounting surfaces and lateral surfaces.

The substrate used in the prismatic glass laminate is preferably a glass panel. However, it should be understood that any suitably flat surface, such as a metal, timber, concrete or plastic surface, could also be used as the substrate.

It is desirable that the substrate comprises at least one substantially planar mounting face on which the plurality of elements are mounted. Mounting the prismatic glass elements on a generally flat surface provides a stronger bond between the substrate and the prismatic glass elements, and minimises the risk of individual glass elements becoming detached from the substrate.

Each of the plurality of prismatic glass elements may comprise a base portion having a predefined thickness. Advantageously, this structure provides glass elements having lateral surfaces of sufficient surface area to allow for the application of the laminating interlayer, and to facilitate the lateral bonding to adjacent elements. It also avoids the problems associated with the manufacture of glass elements having sharp edges.

Further, each of the plurality of prismatic glass elements preferably comprises an upper portion having a shape which is adapted to refract incident light which may be substantially the same or different to one or more of the other elements to achieve any desired effect. In addition, the directions of the linear prismatic glass elements on each side of the substrate may also be aligned or rotated as required to obtain the desired effect. The shape of the upper portion may be an elongate triangular prism. Alternatively, the shape of the upper portion may be a hexagonal pyramid. It is desirable that the shape of the upper portion is determined by the requirements of the particular architectural application. The refractive and reflective characteristics of varying shapes will naturally determine the visual appearance of the prismatic glass laminate. Therefore, it should be understood that any three dimensional geometrical shape could be applied to the upper portion of the individual prismatic glass elements. Furthermore, it should also be understood that a number of varying shapes could be applied to the upper portion of prismatic glass elements within a single prismatic glass laminate.

A further potential advantage of the prismatic glass laminate according to the present invention is that the overall thickness of the prismatic glass elements could be reduced to the required depth of the upper portion, plus a base portion having a minimum depth of approximately 1 to 2 mm which would avoid the weaknesses inherent in sharp edges of glass. This would allow prismatic glass laminates to be manufactured using substantially thinner prismatic glass elements which would reduce both the cost of manufacture and the weight of the laminate.

The respective lateral surfaces of adjacent elements adjoined by the laminating interlayer may be substantially parallel. However, in an alternate embodiment of the invention, the substrate may comprise a curved mounting face on which the plurality of elements are mounted. With regard to this embodiment, it should be understood that the respective lateral surfaces of adjacent elements adjoined by the laminating interlayer may not be parallel.

The refractive index of the laminating interlayer, at the lateral surface and/or mounting surface of the element, may be substantially the same as the refractive index of each of the plurality of elements. In a number of architectural applications it may be desirable to use an "optically clear" laminating interlayer which does not affect the refractive properties of the laminate. Such applications may also include the use of a glass panel as the underlying substrate.

The laminating interlayer applied to the mounting surface and the laminating interlayer applied to the lateral surface may be different substances. Depending on the physical characteristics of the substrate selected, it may be necessary to use a different laminating interlayer for providing adhesion of the prismatic glass elements to the underlying substrate.

A further enhancement to the embodiments of the present invention described previously is the application of a reflective coating on some or all facets of the prismatic glass elements and/or the substrate. This coating is preferably silver based. However, it should be understood that any coating which reflects visible light to an extent greater than occurs with the uncoated glass surface can be used. Generally, such coatings are formulated to reflect more than 30% of the visible light entering or exiting the glass surface. Such coatings can be applied to various surfaces to enhance the intensity of rainbow effects generated by white light, relative to those obtainable without the coating.

According to a further aspect of the present invention, there is provided a laminated glass panel comprising:
(a) a glass substrate; and
(b) a plurality of prismatic glass elements mounted on a planar surface of said glass substrate, each element comprising:
  (i) a mounting surface to which a laminating interlayer is applied, said laminating interlayer providing adhesion of said element to the glass substrate; and
  (ii) a lateral surface to which the laminating interlayer is applied, said laminating interlayer providing adhesion of said element to the lateral surface of an adjacent element.

In a further embodiment of the present invention, the substrate may not be present so that the mounting surfaces of the prismatic glass elements are directly bonded to each other using opposing surfaces of an interlayer. This embodiment can be applied using any prismatic element shape and size, subject to achieving the rigidity and structural integrity required for the proposed application.

According to this preferred embodiment there is provided, a decorative panel comprising:
(a) an interlayer; and
(b) a plurality of prismatic glass elements mounted on opposing planar surfaces of the interlayer, each element comprising:
  (i) a mounting surface to which the interlayer is applied, the interlayer providing adhesion of said element to the glass substrate; and
  (ii) a lateral surface to which the interlayer is applied, the interlayer providing adhesion of said element to the lateral surface of an adjacent element.

BRIEF DESCRIPTION OF THE DRAWINGS

Preferred embodiments of the present invention will now be described with reference to the accompanying drawings. These embodiments are given by way of illustration only and other embodiments of the invention are possible. Consequently, the particularity of the accompanying drawings is not to be understood as superseding the generality of the preceding description. In the drawings.

DESCRIPTION OF PREFERRED EMBODIMENTS

Embodiments of the prismatic glass laminate will now be described with reference to the accompanying drawings. The invention is particularly useful in relation to decorative architectural applications and it will therefore be convenient to describe the invention in that environment. However, it should be understood that the invention is intended for broader application and use.

Figure 1A:
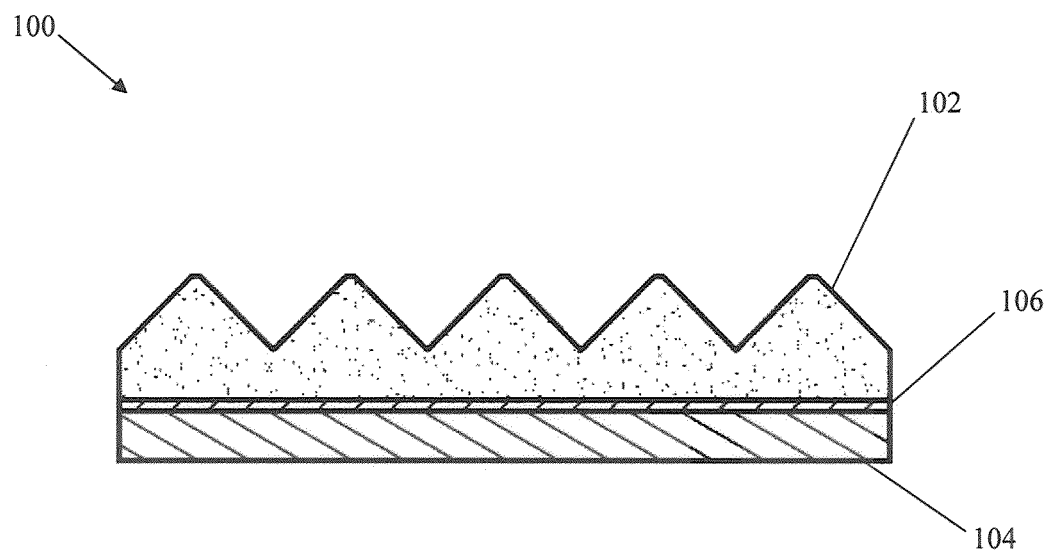
FIG. 1A is a side view line drawing of a conventional prismatic glass laminate.
Figure 1B:
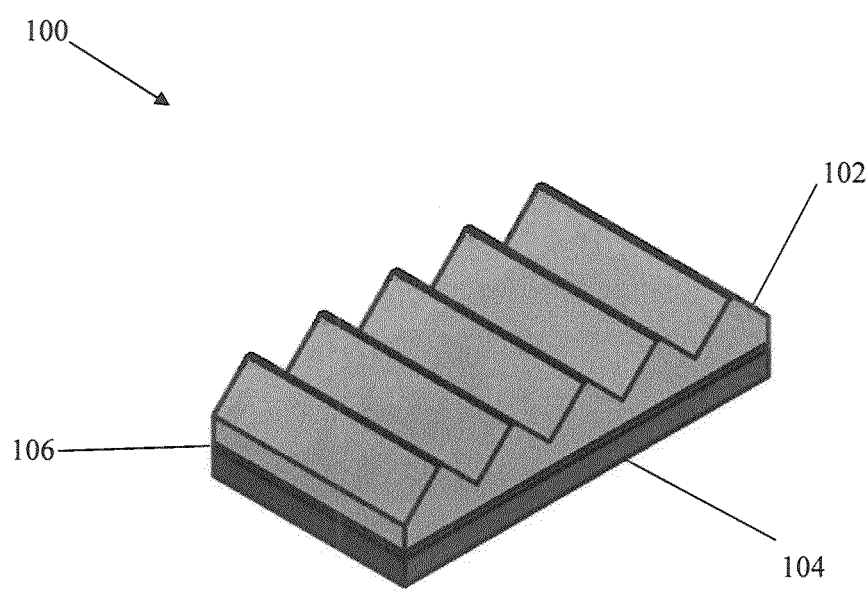
FIG. 1B is a perspective line view of the conventional prismatic glass laminate of FIG. 1A.
Figure 2A:
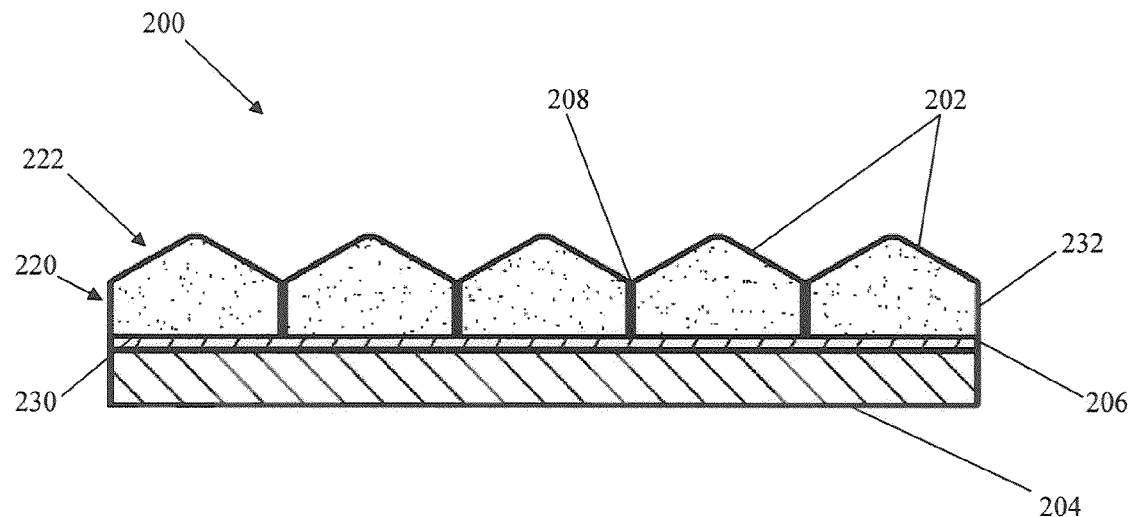
FIG. 2A is a side view line drawing of a prismatic glass laminate according to a preferred embodiment of the present invention.
Figure 2B:
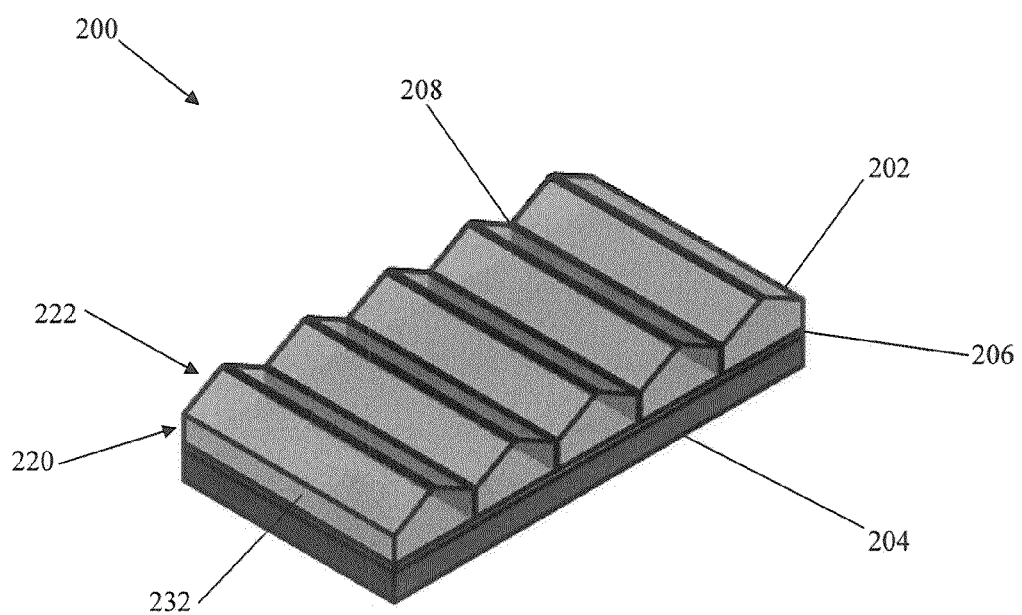
FIG. 2B is a perspective view line drawing of the prismatic glass laminate of FIG. 2A.

FIG. 2A shows a side view line drawing of a prismatic glass laminate 200 according to a preferred embodiment of the present invention. The prismatic glass laminate 200 according to this preferred embodiment is also illustrated in FIG. 2B as a perspective view line drawing. The laminate 200 comprises a plurality of prismatic glass elements 202 mounted on an underlying substrate 204, which is preferably a glass panel having a substantially planar mounting surface. Each of the prismatic glass elements 202 comprises a base portion 220 and an upper portion 222. The base portion 220 includes a mounting surface 230 to which a laminating interlayer 206 is applied to create an adhesive bond between the prismatic glass element 202 and the underlying substrate 204. The base portion 220 also comprises a lateral surface 232 to which the laminating interlayer 208 is applied to create an adhesive bond between adjacent elements 202.

Both the mounting surface 230 and the lateral surface 232 of the base portion 220 are substantially flat or planar surfaces, in order to assist with the application of the laminating interlayers 206 and 208. Advantageously, the use of flat surfaces allows the laminating interlayers 206 and 208 to provide a stronger adhesive bond.

The laminating interlayers 206 and 208 used may vary depending on the particular architectural application. A polyvinyl-butyral (PVB) resin is commonly used in the automotive and architectural industries, and is particularly useful where it is necessary to bond together two panels or pieces of glass. However, PVB may not be suitable as the is laminating interlayers 206 and 208 in exterior architectural applications as exposure to moisture can often cause the PVB to deteriorate, which may lead to de-lamination of the prismatic glass laminate 200. An alternative laminating interlayer 206 and 208, which is more suited to exterior applications, is an ionomer resin such as SentryGlas® Plus Interlayer manufactured by DuPont. Ionomer resins are also particularly effective if the underlying substrate is a metal, such a stainless steel. In any event, the bonding process remains substantially the same, and a combination of heat and pressure must be applied to the laminating interlayers 206 and 208 in order for it to act as a bonding agent.

In particular architectural applications, it may be desirable to use laminating interlayers 206 and 208 that have a refractive index similar to the refractive index of the prismatic glass elements 202. Such laminating interlayers 206 and 208 are described as being "optically clear" and become almost invisible after the completion of the heating and curing processes. Examples of laminating interlayers 206 and 208 which are "optically clear" include both PVB resin and certain ionomer resins.

In an embodiment of the present invention, the laminating interlayer 206 applied between the prismatic glass elements 202 and the substrate 204 may be a different substance to the laminating interlayer 208 applied between adjacent elements 202. Depending on the physical characteristics of the substrate 204 selected, it may be necessary to use a different laminating interlayer 206 for providing adhesion of the prismatic glass elements 202 to the underlying substrate 204.

Whilst certain laminating interlayers 206, such as PVB resin, are particular useful for bonding together glass surfaces, if the substrate 204 is a material such as metal, timber, concrete or plastic, then a different laminating interlayer 206 may be more suitable.

In a particularly preferred embodiment of the invention, each of prismatic glass elements 202 is adhered to the respective lateral surfaces 232 of at least two adjacent elements 202. By constructing the laminate 200 in this manner, the laminating interlayers 206 and 208 are applied to at least three surfaces of each of the prismatic glass elements 202. Thus, each of the elements 202 is affixed to both the underlying substrate 204, and to at least two adjacent elements 202. This provides the laminate 200 with a greater degree of structural integrity, and also minimises the likelihood of individual glass elements 202 becoming detached from the underlying substrate 204. Furthermore, separating each of the prismatic glass elements 202 with a viscoelastic laminating interlayer 208 ensures that a crack or fracture in an individual element 202 does not propagate to adjacent elements.

Each of the plurality of prismatic glass elements 202 comprises an upper portion 222 having a shape which is adapted to refract incident light. In a particularly preferred embodiment of the invention, the shape of the upper portion 222 is an elongate triangular prism. However, it should be understood that the shape of the upper portion 222 may vary depending on the visual requirements of the particular architectural application. Given that the refractive and reflective characteristics of varying shapes will determine the visual appearance of the laminate 200, it is possible for the upper portion 222 to be shaped in a wide variety of three dimensional prismatic shapes.

The plurality of prismatic glass elements 202 are arranged on the underlying substrate 204 in a regular pattern such that the respective lateral surfaces 232 of the elements 202 are substantially parallel. Each of the elements 202 has an elongate shape which advantageously provides a degree of rigidity to the laminate 200, and assists with the mounting of the laminate 200 on a presentation surface. Furthermore, the base portion 220 of each of the elements 202 has a predefined thickness of between 1 to 2 mm. This structure provides glass elements 202 having lateral surfaces 232 of sufficient surface area to allow for the application of the laminating interlayer 208, and to facilitate the lateral bonding to adjacent elements 202. As the base portion 220 and the upper portion 222 are integrally formed, the base portion 220 also overcomes the inherent structural weaknesses that may otherwise exist at sharp edges of the glass.

The individual prismatic glass elements 202 can be manufactured using conventional techniques, such as by cutting float glass of an appropriate thickness. Alternatively, the glass elements 202 could be formed by casting or extruding a cross section that approximates the desired final (net) shape of the glass elements 202. Furthermore, the prismatic glass elements 202 can be efficiently and precisely ground and polished using a standard configuration of sequential diamond and compound grinding, and polishing cup wheels operating at high speeds.

Figure 3A:
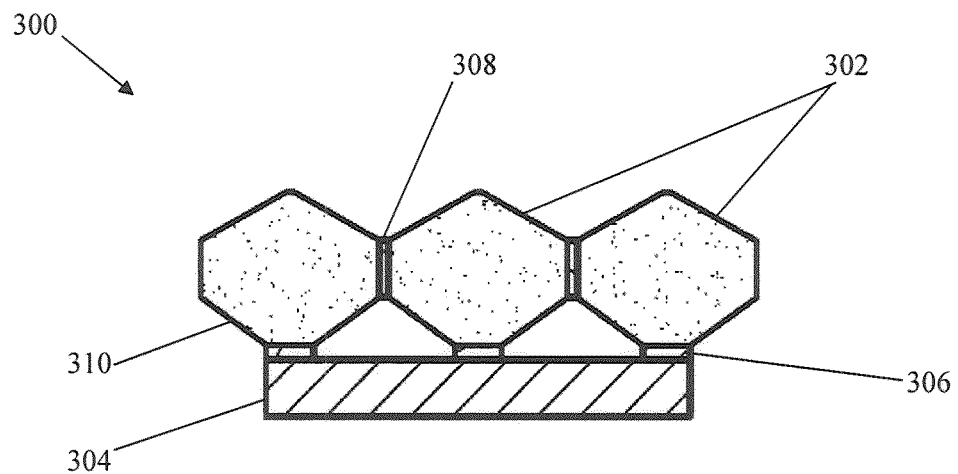
FIG. 3A is side view line drawing of a prismatic glass laminate having prismatic glass elements with undercut surfaces according to a further embodiment of the present invention.
Figure 3B:
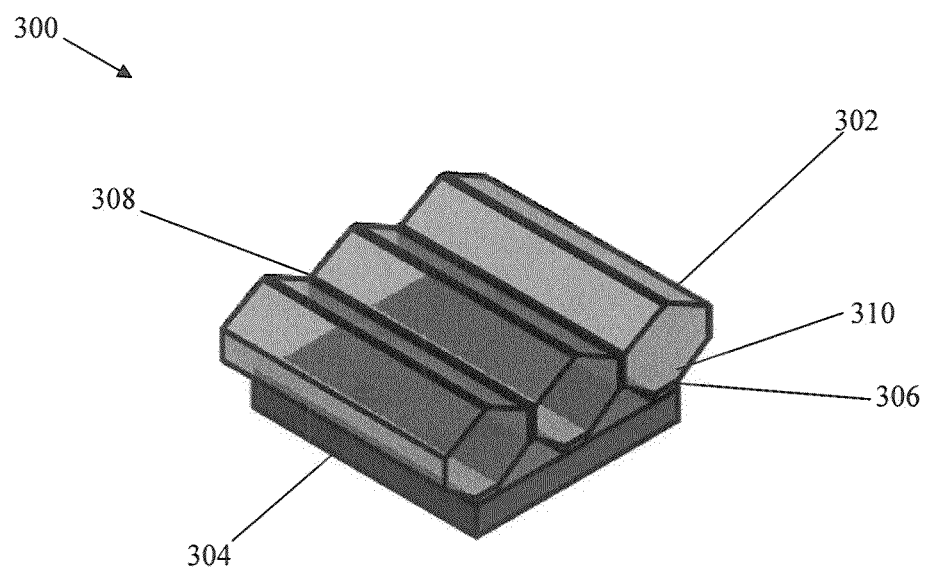
FIG. 3B is a perspective view line drawing of the prismatic glass laminate of FIG. 3A.

FIG. 3A is side view line drawing of a prismatic glass laminate 300 having prismatic glass elements 302 with undercut surfaces according to a further embodiment of the present invention. The prismatic glass laminate 300 according this embodiment is also illustrated in FIG. 3B as a perspective view line drawing. This embodiment of the invention is substantially the same as the prismatic glass laminate shown in FIGS. 2A and 213, with the exception that the prismatic glass elements 302 comprise one or more undercut surfaces 310.

Despite the presence of the undercut surfaces 310, each of the elements 302 still comprises a mounting surface (not shown) of sufficient surface area to allow for a secure bond between the element 302 and the underlying substrate 304.

Each of the elements 302 are affixed to the underlying substrate 304 using a laminating interlayer 306, and laterally affixed to adjacent elements 302 using a laminating interlayer 308. The undercut surfaces 310 are designed, much like the cut surfaces of diamonds, to provide the prismatic glass elements 302 with varying refractive and reflective characteristics. By altering the shape of each of the prismatic glass elements 302 it is possible to change the visual appearance of the laminate 300.

Figure 4A:
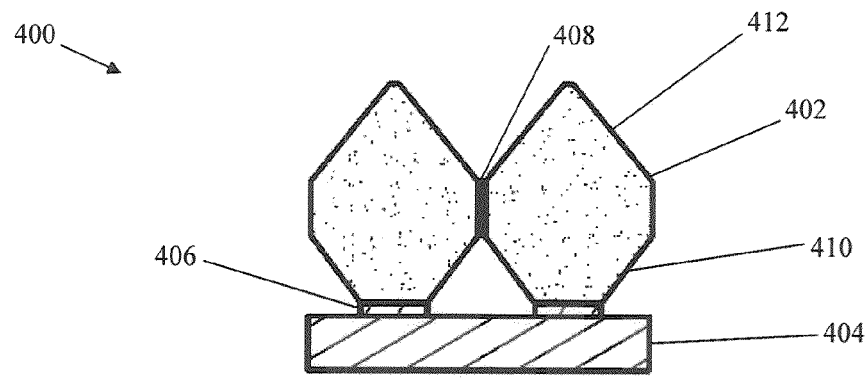
FIG. 4A is side view line drawing of a prismatic glass laminate according to a further embodiment of the present invention.
Figure 4B:
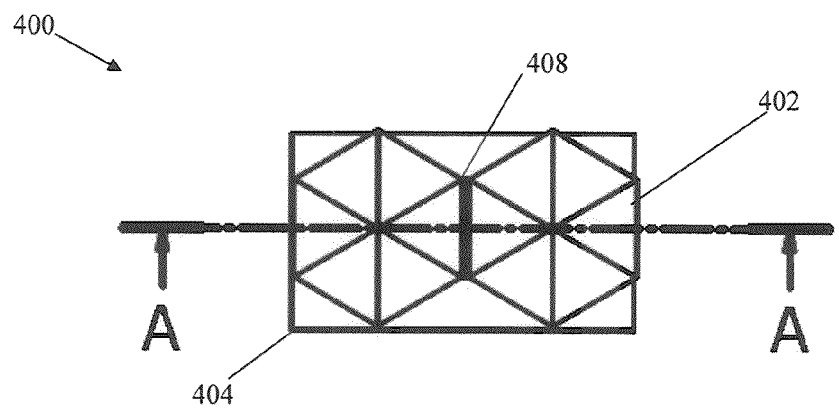
FIG. 4B is a top view schematic line drawing of the prismatic glass laminate of FIG. 4A.
Figure 4C:
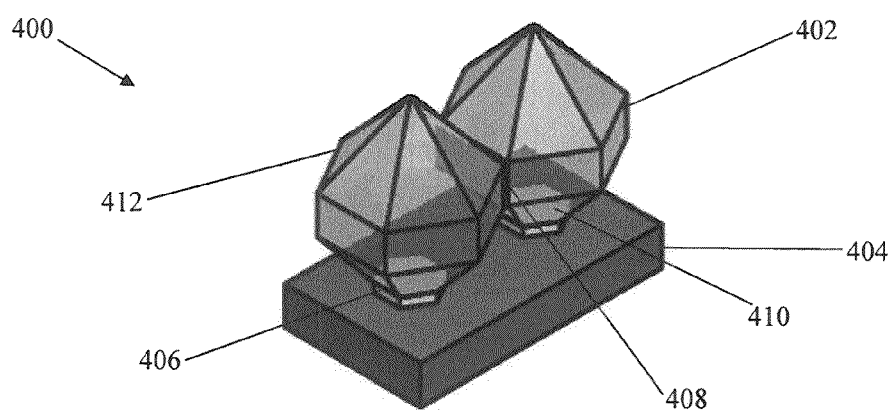
FIG. 4C is a perspective view line drawing of the prismatic glass laminate of FIG. 4A.

FIG. 4A is side view line drawing of a prismatic glass laminate 400 according to a further embodiment of the present invention. FIG. 4B is a top view schematic line drawing of the prismatic glass laminate 400 of FIG. 4A, whilst FIG. 4C shows a perspective view line drawing of the prismatic glass laminate 400 of FIG. 4A. This embodiment of the invention is substantially the same as the prismatic glass laminate shown in FIGS. 2A and 2B, with the exception that the prismatic glass elements 402 comprise a plurality of undercut surfaces 410, and a plurality of overcut surfaces 412. Despite the presence of the undercut surfaces 410, each of the elements 402 still comprises a mounting surface (not shown) of sufficient surface area to allow for a secure bond between the element 402 and the underlying substrate 404.

Each of the elements 402 are affixed to the underlying substrate 404 using a laminating interlayer 406, and laterally affixed to adjacent elements 402 using a laminating interlayer 408. The upper portion of the element 402 comprises a number of overcut surfaces 412 that form the shape of a hexagonal pyramid. However, it should be understood that any polygonal pyramids could be applied as the shape for the upper portion of the element 402. Similarly, the elements 402 also comprise a plurality of undercut surfaces 410, which are also designed to provide the prismatic glass elements 402 with varying refractive and reflective characteristics, and thereby change the visual appearance of the laminate 400.

Figure 5A:
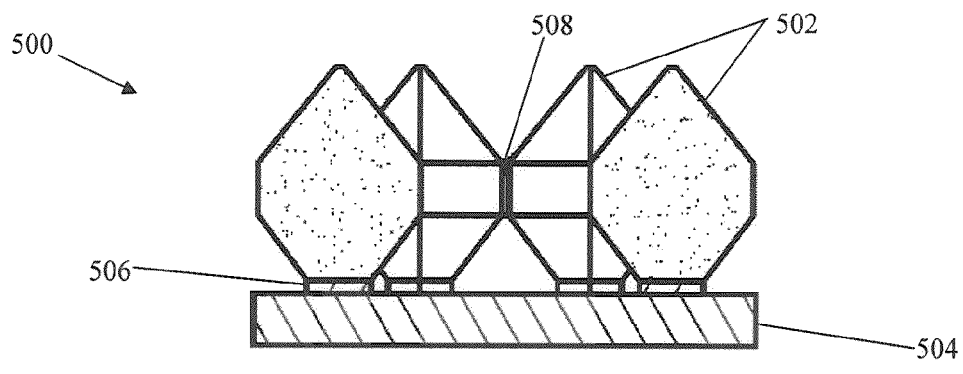
FIG. 5A is side view line drawing of a prismatic glass laminate according to a further embodiment of the present invention.
Figure 5B:
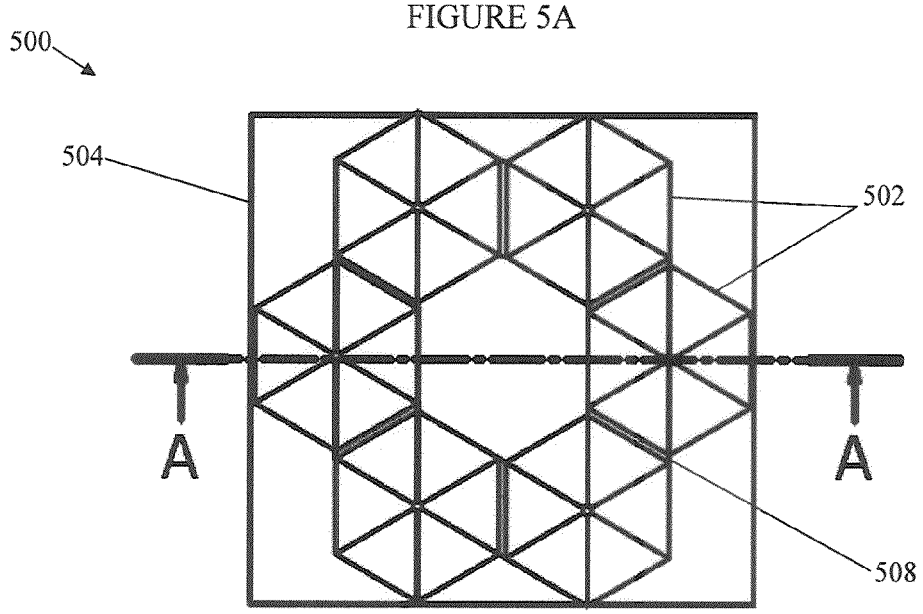
FIG. 5B is a top view schematic line drawing of the prismatic glass laminate of FIG. 5A.
Figure 5C:
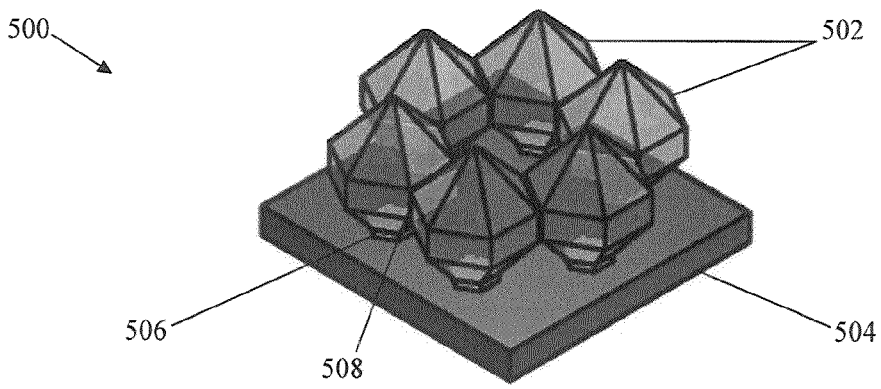
FIG. 5C is a perspective view line drawing of the prismatic glass laminate of FIG. 5A.

FIG. 5A is side view line drawing of a prismatic glass laminate according to a further embodiment of the present invention. FIG. 5B is a top view schematic line drawing of the prismatic glass laminate 500 of FIG. 5A, whilst FIG. 5C shows a perspective view line drawing of the prismatic glass laminate 500 of FIG. 5A. The prismatic glass elements 502 shown in this embodiment of the invention are identical to those described above in relation to FIGS. 4A to 4C. However, the elements 502 are affixed to the underlying substrate 504 in a configuration such that each element 502 is laterally affixed to at least two adjacent elements 502. Each of the elements 502 are affixed to the substrate 504 using a laminating interlayer 506, and to the adjacent elements 502 using a laminating interlayer 508. By mourning the elements 502 in this configuration it is possible to provide a laminate 500 with a different visual appearance that may be desirable in particular architectural applications.

Figure 6A:
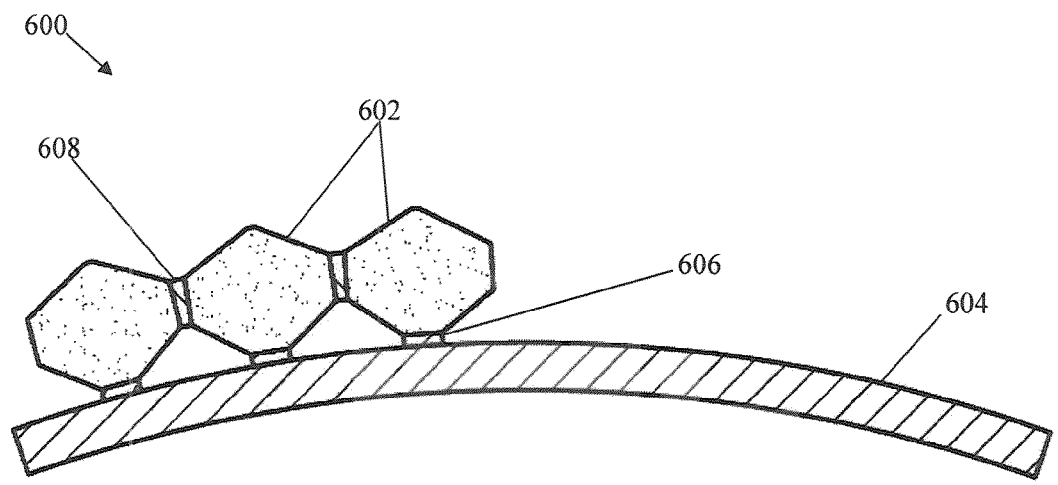
FIG. 6A is a side view line drawing of a prismatic glass laminate having a curved substrate according to a further embodiment of the present invention.
Figure 6B:
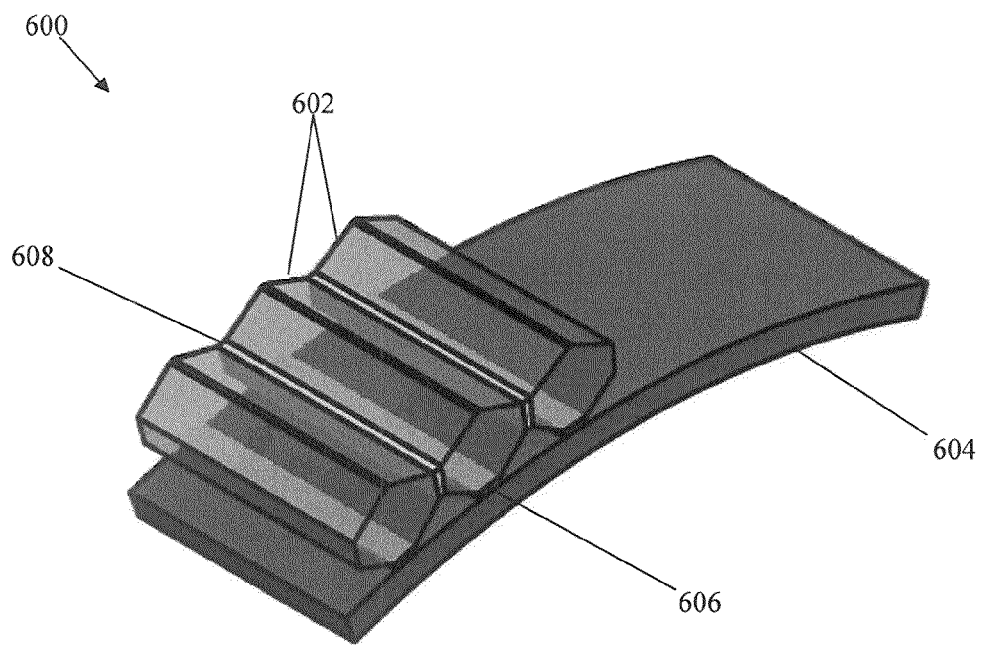
FIG. 6B is a perspective view line drawing of the prismatic glass laminate of FIG. 6A.

FIG. 6A is a side view line drawing of a prismatic glass laminate 600 having a curved substrate according to a further embodiment of the present invention. The prismatic glass laminate 600 according to this embodiment is also illustrated in FIG. 6B as a perspective view line drawing. The laminate 600 comprises a curved substrate 604, upon which a plurality of prismatic glass elements 602 are mounted using a suitable laminating interlayer 606. Each of the prismatic glass elements 602 are also laterally affixed to adjacent elements 602 using the laminating interlayer 608.

in an alternate embodiment of the invention, the curved substrate 604 may incorporate a complex curve such as a spherical surface. In this instance, it would be necessary to machine the mounting surfaces of the prismatic glass elements 602 to accommodate the complex, three dimensional, curvature of the substrate.

Whilst the embodiment of the laminate 600 shown in FIGS. 6A and 6B comprises prismatic glass elements 602 of a particular shape, it should be understood that any suitably shaped element could be used.

Figure 7A:
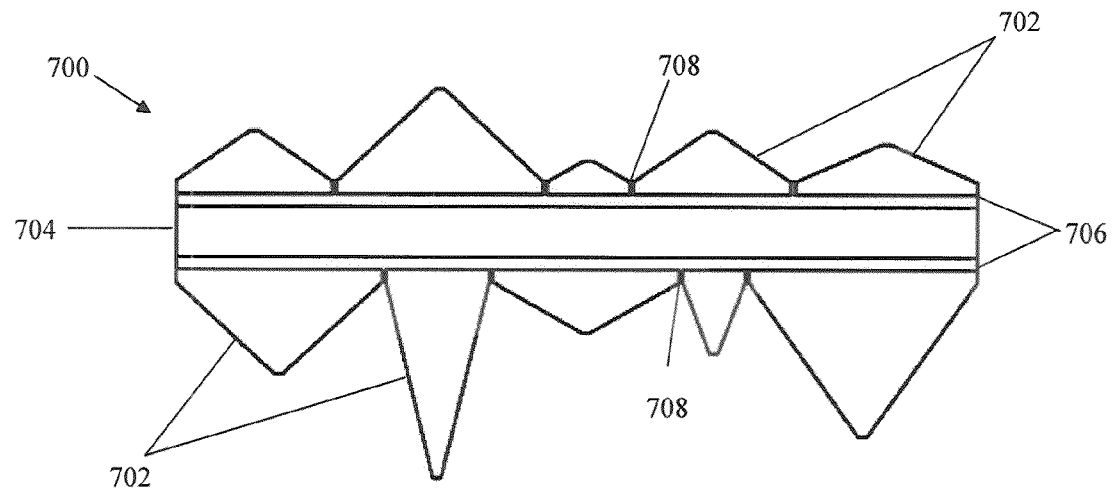
FIG. 7A is a side view line drawing of a prismatic glass laminate having prismatic glass elements mounted on both sides of the substrate according to a further embodiment of the present invention.
Figure 7B:
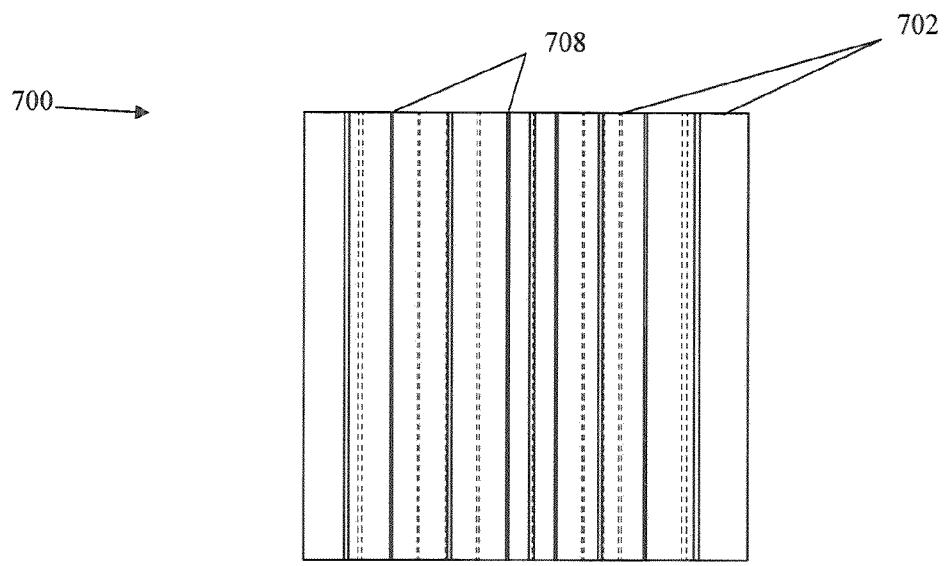
FIG. 7B is a top view schematic line drawing of the prismatic glass laminate of FIG. 7A.
Figure 7C:
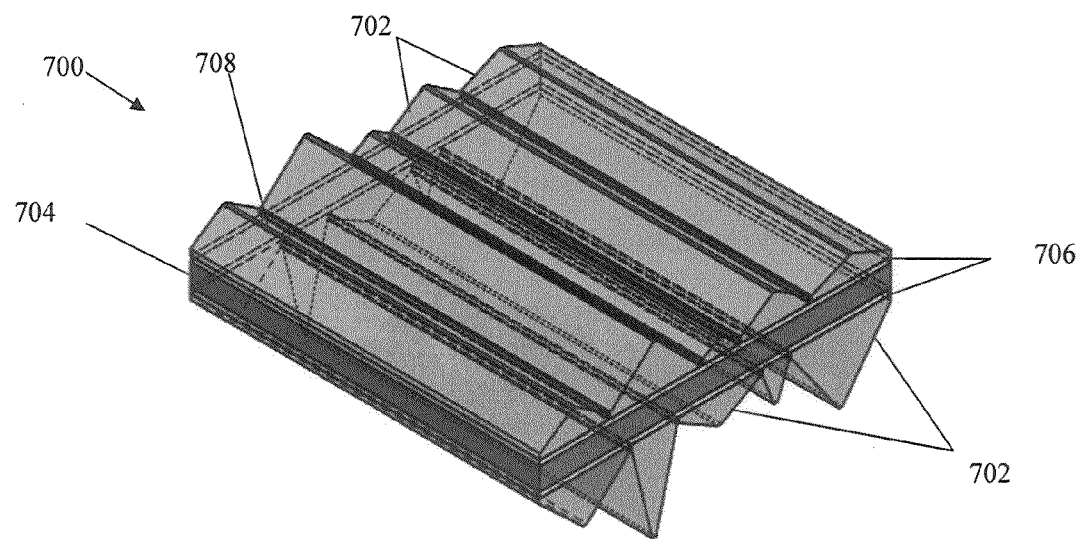
FIG. 7C is a perspective view line drawing of the prismatic glass laminate of FIG. 7A.

FIG. 7A is a side view line drawing of a prismatic glass laminate 700 having prismatic glass elements mounted on both sides of a flat transparent substrate according to a further embodiment of the present invention. FIG. 7B is a top view schematic line drawing of the prismatic glass laminate 700 of FIG. 7A, whilst FIG. 7C shows a perspective view line drawing of the prismatic glass laminate 700 of FIG. 7A. Each of the elements 702 are affixed to the substrate 704 using a transparent laminating interlayer 706, and laterally affixed to adjacent elements 702 using a transparent laminating interlayer 708. In this embodiment of the invention the upper portions of the glass elements 702 have a variety of shapes and facet angles to achieve a variety of prismatic effects.

Figure 8A:
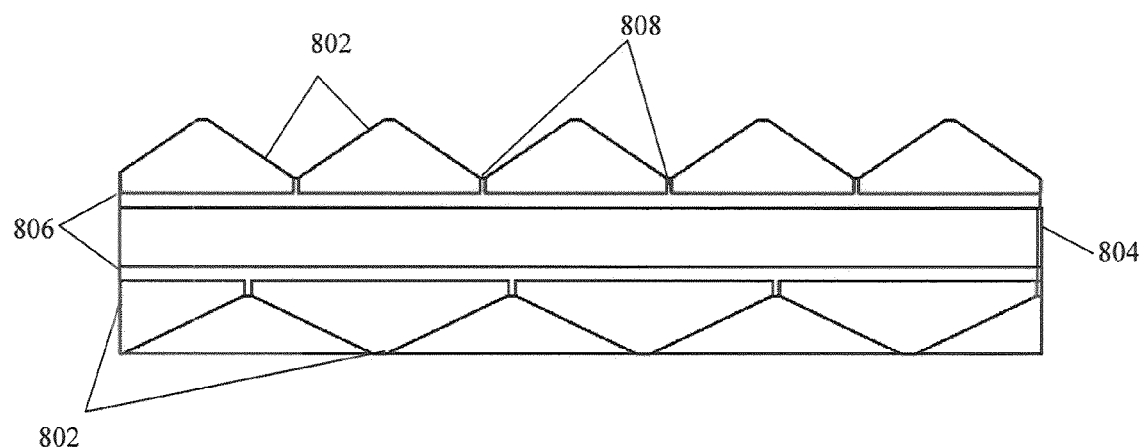
FIG. 8A is a side view line drawing of a prismatic glass laminate according to a further embodiment of the present invention.
Figure 8B:
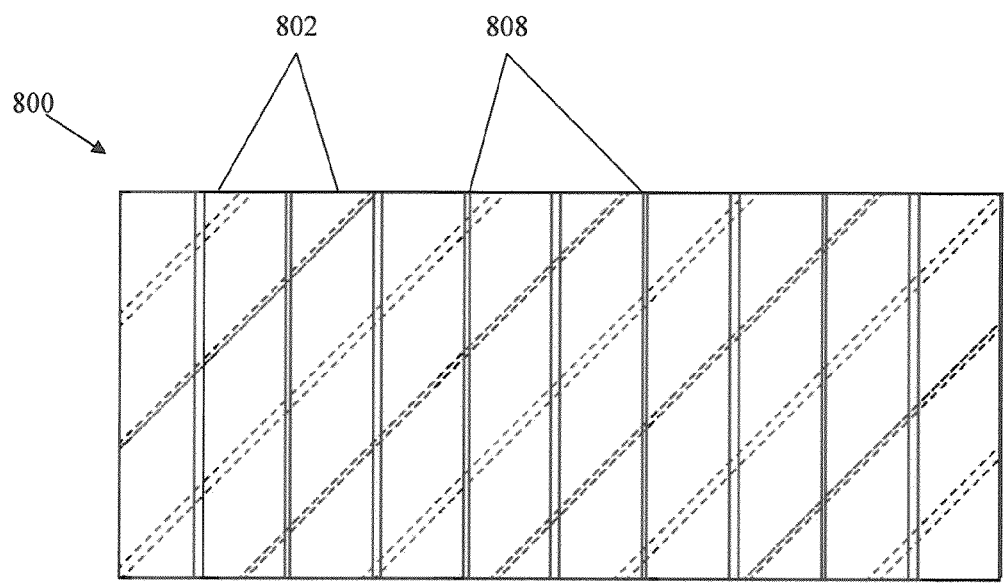
FIG. 8B is a top view schematic line drawing of the prismatic glass laminate of FIG. 8A.
Figure 8C:
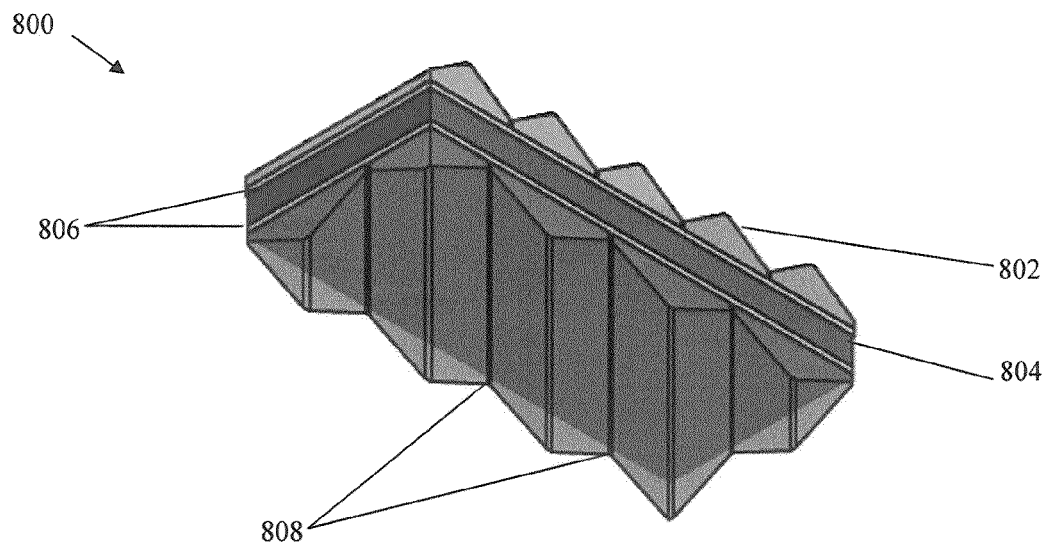
FIG. 8C is a perspective view line drawing of the prismatic glass laminate of FIG. 8A.

FIG. 8A is a side view line drawing of a prismatic glass laminate 800 according to a further embodiment of the present invention. FIG. 8B is a top view schematic line drawing of the prismatic glass laminate of FIG. 8A. FIG. 8C is a perspective view line drawing of the prismatic glass laminate of FIG. 8A. In this embodiment of the invention linear prismatic glass laminates 802 are mounted on both sides of a flat transparent substrate 804 with the elements 802 on one face of the substrate 804 rotated 45 degrees relative to the other. Each of the elements 802 are affixed to the substrate 804 by a transparent laminating interlayer 806, and laterally affixed to adjacent elements 802 using a transparent laminating interlayer 808.

Figure 9A:
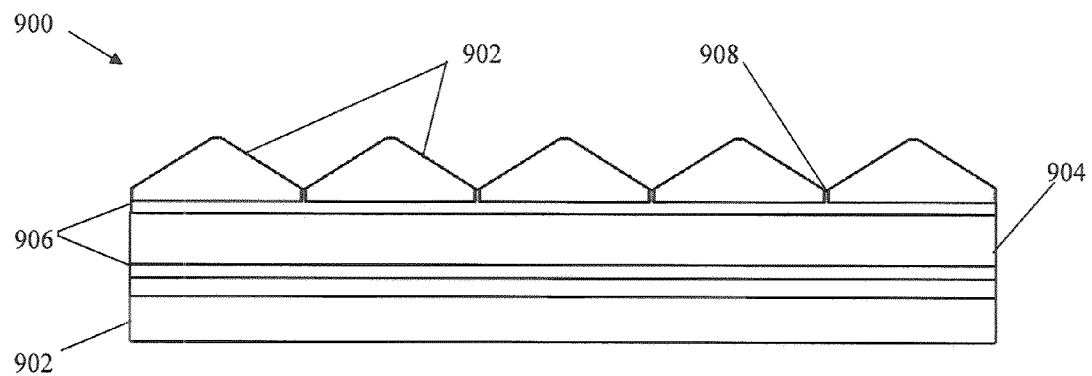
FIG. 9A is a side view line drawing of a prismatic glass laminate according to a further embodiment of the present invention.
Figure 9B:
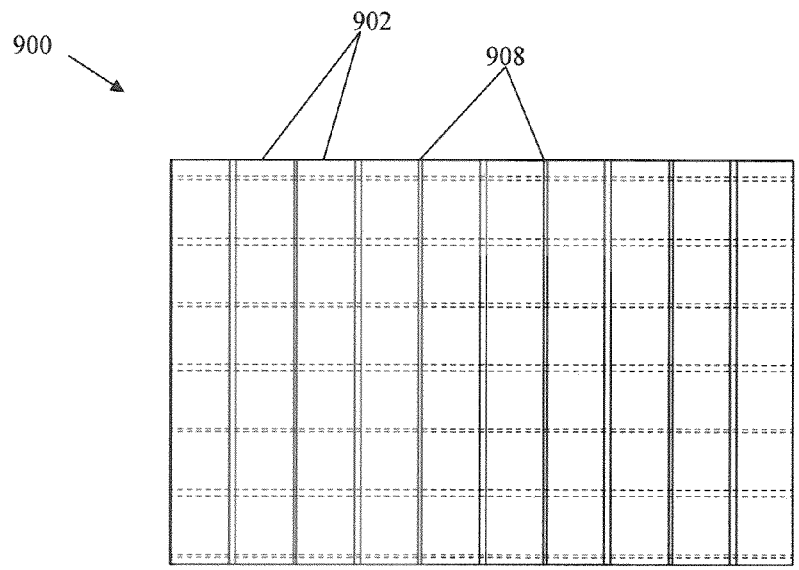
FIG. 9B is a top view schematic line drawing of the prismatic glass laminate of FIG. 9A.
Figure 9C:
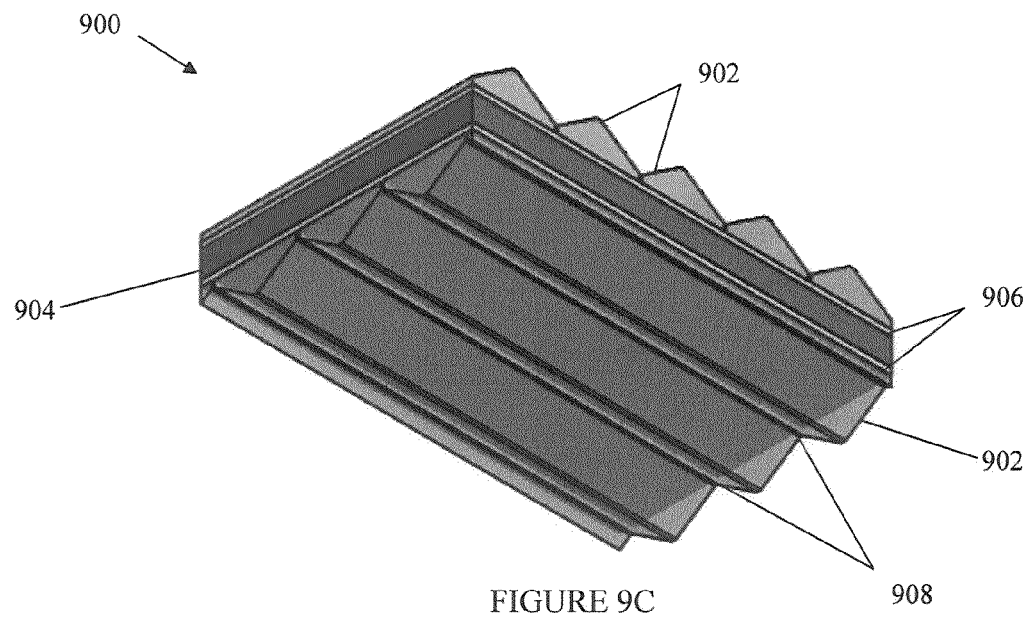
FIG. 9C is a perspective view line drawing of the prismatic glass laminate of FIG. 9A viewed from below.
Figure 9D:
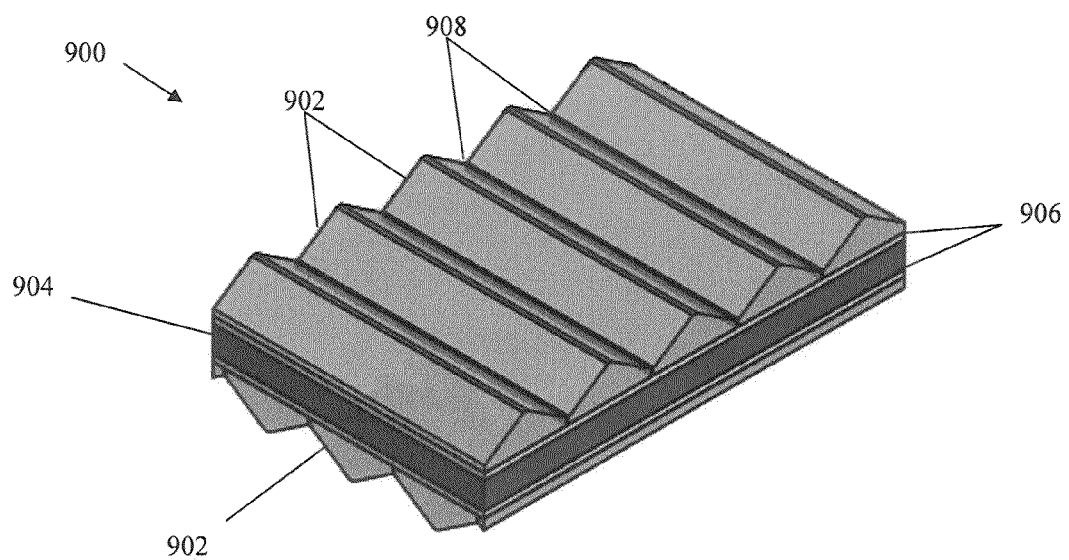
FIG. 9D is a perspective view line drawing of the prismatic glass laminate of FIG. 9A viewed from above.

FIG. 9A is a side view line drawing of a prismatic glass laminate 900 according to a further embodiment of the present invention. FIG. 9B is a top view schematic line drawing of the prismatic glass laminate of FIG. 9A. FIG. 9C is a perspective view line drawing of the prismatic glass laminate of FIG. 9A viewed from below. FIG. 9D is a perspective view line drawing of the prismatic glass laminate of FIG. 9A viewed from above. This embodiment of the invention is substantially the same as the prismatic glass laminate shown in FIGS. 8A to 8C, with the exception that the linear prismatic glass elements 902 on one face of the transparent substrate 904 are rotated 90 degrees relative to the glass elements 902 on the other face. Each of the elements 902 are affixed to the substrate 904 using a transparent laminating interlayer 906, and laterally affixed to adjacent elements 902 using a transparent laminating interlayer 908.

The figures described above are merely examples of preferred embodiments of the present invention and demonstrate that linear elements on one side of a substrate may be rotated at any angle relative to those on the other side of a two-sided prismatic laminate. Similarly, the invention encompasses prismatic glass element types which vary from one side of the substrate to the other or even over the surface of any one side of the substrate.

The word 'comprising' and forms of the word 'comprising' as used in this description and in the claims does not limit the invention claimed to exclude any variants or additions.

As the present invention may be embodied in several forms without departing from the essential characteristics of the invention, it should be understood that the above described embodiments should not be considered to limit the present invention but rather should be construed broadly. Various modifications, improvements and equivalent arrangements will be readily apparent to those skilled in the art, and are intended to be included within the spirit and scope of the invention.

The invention claimed is:

1. A prismatic glass laminate comprising:
   (a) a substrate; and
   (b) a plurality of prismatic glass elements mounted on said substrate, each said element being glass with machined surfaces which are optically flat and polished to generate a prismatic effect comprising:
      (i) a mounting surface to which a laminating interlayer is applied, said laminating interlayer providing adhesion of said element to the substrate; and
      (ii) is lateral surface of a first prismatic glass element between adjacent prismatic glass elements to which a laminating interlayer is applied, said laminating interlayer providing adhesion of said first prismatic glass element to the lateral surface of an adjacent prismatic glass element wherein the laminating interlayer has is refractive index substantially similar to the plurality of prIsmatic glass elements.

2. A prismatic glass laminate according to claim 1 wherein the pluraity of prismatic glass elements are mounted on both sides of the substrate.

3. The prismatic glass laminate according to claim 1, wherein said substrate is a glass panel.

4. The prismatic glass laminate according to claim 1, wherein the substrate comprises one or more substantially planar mounting faces on which the plurality of elements are mounted.

5. The prismatic glass laminate according to claim 1, wherein each of the plurality of elements comprises a base portion having a predefined thickness.

6. The prismatic glass laminate according to claim 5, wherein the base portion has an elongate Shape that provides structural support to the laminate.

7. The prismatic glass laminate accordin to claim 1, wherein each of the plurality of elements comprises an upper portion having a shape which is adapted to refract incident light.

8. The prismatic glass laminate according to claim 7 wherein the shape of one or more of the upper portions of the plurality of elements differs from the shape of the upper portions of one or more of the remaining elements.

9. The prismatic glass laminate according to claim 7 wherein the shape of the upper portion of each of the plurality of elements is substantially the same.

10. The prismatic glass laminate according to claim 7, wherein the shape of the upper portion is an elongate triangular prism.

11. The prismatic glass laminate according to claim 7, wherein the shape of the upper portion is ahexagonal pyramid.

12. The prismatic glass laminate according to claim 1, wherein the respective lateral surfaces of adjacent elements adjoined by the laminating interlayer are substantially parallel.

13. The prismatic glass laminate according to claim 1, wherein the mounting surface of each of the plurality of elements is planar.

14. The prismatic glass laminate according to claim 1, wherein the lateral surface of each of the plurality of elements is planar.

15. A prismatic glass laminate according to claim 1, wherein the refractive index of the laminating interlayer at the mounting surface of the element, is substantially the same as the refractive index of each of the plurality of elements.

16. A prismatic glass laminate according to claim 1, wherein the laminating interlayer applied to the mounting surface and the laminating interlayer applied to the lateral surface are different substances.

17. A prismatic glass laminate according to claim 1, wherein the substrate comprises a curved mounting face on which the plurality of elements are mounted.

18. A prismatic, glass laminate according to claim wherein part or all of one or more of the elements and/or substrate has a reflective coating.

19. A laminated glass panel comprising:
   (a) a glass substrae; and
   (b) a plurality of prismatic glass elements mounted on a planar surface of said glass substrate, each said element being glass with machined surfaces which are optically flat and polished to generate a prismatie effect comprising.
      (i) a mounting surface to which a laminating interlayer is applied, said laminating interlayer providing adhesion of said element to the glass substrate; and
      (ii) a lateral surface of a first prismatic glass element between adjacent prismatic glass elements to which the laminating interlayer is applied, said laminating interlayer providing adhesion of said first prismatic glass element to the lateral surface of an adjacent prismatic glass element wherein the laminating interlayer has a refractive index substantially similar to the plurality of prismatic glass elements.

20. A laminated glass panel according to claim 19 wherein the plurality of prismatic glass elements are mounted on both sides of the glass substrate.

21. The laminated glass panel according to claim 19, wherein each of the plurality of elements comprises a base portion having a predefined thickness.

22. The laminated glass panel according to claim 19, wherein the base portion has an elongate shape that provides structural support to the laminate.

23. The laminated glass panel according to claim 19, wherein each of the plurality of elements comprises an upper portio having a shape which is adapted to refract incident light which may be substantially the same different to one or more of the other elements.

24. The laminate glass panel according claim 23, wherein the shape of the upper portion is an elongate triangular prism.

25. The laminated glass panel according to claim 23, wherein the upper portion and the base portion are integrally formed.

26. A decorative panel comprising:
   (a) a glass substrate; and
   (b) a plurality of prismatic glass elements mounted on opposing planar surfaces of said glass substrate, each said element being glass with machine surfaces which are optically flat and polish to generate a prismatic effect comprising:
      (i) a mounting surface to which an interlayer is applied, the interlayer providing adhesion of said element to the glass substrate; and
      (ii) a lateral surface of a first prismatic glass element between adjacent prismatic glass elements to which the interlayer is applied, the interlayer providing adhesion of said first prismatic glass element to the lateral surface of an adjacent prismatic glass element wherein the laminating interlayer has a refractive index substantially similar to the plurality of prismatic glass elements.

* * * * *